United States Patent [19]

Chin et al.

[11] Patent Number: 5,307,432
[45] Date of Patent: Apr. 26, 1994

[54] CRIMPED LIGHT SOURCE TERMINATIONS

[75] Inventors: Noelle S. Chin, Shrewsbury, Mass.; James A. Heywood, Briston, Pa.

[73] Assignee: Luxtec Corporation, Worcester, Mass.

[21] Appl. No.: 958,905

[22] Filed: Oct. 9, 1992

[51] Int. Cl.5 .................................... G02B 6/36
[52] U.S. Cl. ...................... 385/81; 385/134; 385/136
[58] Field of Search ............. 385/62, 69, 81, 86, 385/87, 134, 136

[56] References Cited

U.S. PATENT DOCUMENTS

| Re. 31,515 | 2/1984 | Heldt | 350/96.21 |
|---|---|---|---|
| 3,999,837 | 12/1976 | Bowen et al. | 385/62 X |
| 4,087,158 | 5/1978 | Lewis et al. | 350/96.21 |
| 4,336,977 | 6/1982 | Monaghan et al. | 350/96.20 |
| 4,567,650 | 2/1986 | Balyasny et al. | 385/134 X |
| 4,576,437 | 3/1986 | Ohta et al. | 350/96.20 |
| 4,589,404 | 5/1986 | Barath et al. | 128/6 |
| 4,674,833 | 6/1987 | Des Forges et al. | 385/81 X |
| 4,693,550 | 9/1987 | Brown et al. | 385/81 |
| 4,754,328 | 6/1988 | Barath et al. | 358/98 |
| 4,961,624 | 10/1990 | Savitsky et al. | 350/96.20 |
| 5,013,122 | 5/1991 | Savitsky et al. | 385/81 |
| 5,140,662 | 8/1992 | Kumar | 385/87 |
| 5,142,602 | 8/1992 | Cabato et al. | 385/87 |

Primary Examiner—John D. Lee
Attorney, Agent, or Firm—Weingarten, Schurgin, Gagnebin & Hayes

[57] ABSTRACT

A system is provided for forming a permanent crimped connection, through which light may be transmitted to and from a fiber-optic cable, by forcibly crimp fitting an adapter for fiber-optic devices, light sources, and light utilization devices, to an end fitting of the fiber-optic cable using a crimping tool. A portion of the end fitting is inserted into an a corresponding passage in the adapter and held in alignment for mating by the crimping tool. When the crimping tool is actuated, a cylindrical outer surface of the end fitting, having a larger diameter than a cylindrical inner surface of the adapter, is pushed into the adapter to create the crimped connection between the end fitting and the adapter.

18 Claims, 6 Drawing Sheets

CRIMPED LIGHT SOURCE TERMINATIONS

FIELD OF THE INVENTION

The invention relates to fiber-optic cable terminations, and more particularly to a fiber-optic cable having an end fitting on each end connectable to a wide variety of fiber-optic devices, light sources, and light utilization devices by crimping.

BACKGROUND OF THE INVENTION

Fiber-optic cables or fiber bundles are widely used for transmitting light over great distances with negligible loss of light intensity. The flexible nature of fiber-optic cables also allows them, and the light they transmit, to be routed around curves in a serpentine manner allowing full flexibility in medical applications. When attached to a light source on one end and a light utilization device on the other end, the fiber-optic cable is especially useful for permitting inspection within the body for various applications in sites that are otherwise inaccessible.

Light sources for medical use and optical instruments take many forms and are commonly customized for particular applications at a factory, wherein cables of commonly used lengths and diameters are permanently mated to fittings for a particular light source and light utilization device. Widespread utilization of fiber-optic technology has resulted in a proliferation of light sources and light utilization devices. Unless the factory is unusually responsive to consumer demand for customized devices, a product distributor is forced to stock an enormous selection of cables having all of the possible combinations of cable lengths, diameters and attachments. Obviously, this results in an undesirable or prohibitively large inventory.

To more adequately respond to customer needs and to provide greater utility, fiber-optic cables have been fitted with threaded ends and screw-on attachments, or a lug with snap-on/snap-off attachments similar to a socket wrench. Threaded and snap connections, however, have serious drawbacks in medical applications. Specifically, the threads of the screws or snap mechanism get dirty and must therefore be cleaned before mating, or proper connection of an attachment to the cable is precluded and a contamination source is then present. Furthermore, screw-on attachments are susceptible to loosening or separating from the cable unless a locking device is used, and snap connections completely disengage from the cable if pulled too hard. The separability of these ends promotes their loss or removal so that the system becomes inoperative.

SUMMARY OF THE INVENTION

The present invention overcomes the disadvantages of threaded and snap connections for fiber-optic cables by providing a system for crimping standardized adapters for light utilization devices and light sources to an end fitting on a fiber-optic cable using a crimping tool. The distributor can thus supply all users with a limited inventory.

In one embodiment of the invention, the system includes a fiber-optic bundle surrounded by a sheath. The cable and sheath are surrounded by and held within a passage in an end fitting that has a cylindrical outer surface for forced mating with a cylindrical inner surface of an adapter. The adapter has a passage adapted to receive the portion of the end fitting that holds the cable end, a cylindrical inner surface adapted to receive the outer surface of the end fitting, and a connector for connecting the adapter to a light source or light utilization device. A crimping tool having a retainer for holding the inner and outer cylindrical surfaces in alignment and a pusher for pushing the end fitting and adapter together is used to make a crimped connection between the end fitting and adapter through which light may be transmitted. Both the adapter and the end fitting can incorporate grooves or shoulders to engage a retainer or a pusher element of the crimping machine so that proper alignment of light passages is ensured and to permit sufficient force to be applied to the end fitting and adapter to crimp the metal.

In another embodiment, a method of crimping standardized adapters to a fiber optic cable involves selecting a desired length of fiber-optic cable with an end fitting at each end; selecting a light source adapter and crimping it to one end of the cable with a crimping tool; and selecting an instrument adapter and crimping it to the other end of the cable with the crimping tool.

In still another embodiment, a crimpable cable connector for a fiber-optic cable is provided having a outer surface for forced mating with a cylindrical inner surface of an adapter adapted to mate with a light source or light utilization device.

In yet another embodiment, a crimping tool is provided for mating an end fitting to an adapter by crimping. The crimping tool uses a retainer for holding the outer surface of the end fitting in alignment with the inner surface of the adapter, a pusher to push the end fitting and adapter together, and an actuator to provide force to the pusher.

BRIEF DESCRIPTION OF THE DRAWINGS

These and further features of the invention may be better understood with reference to the accompanying specification and the drawings in which.

DETAILED DESCRIPTION OF THE INVENTION

Figure 1:
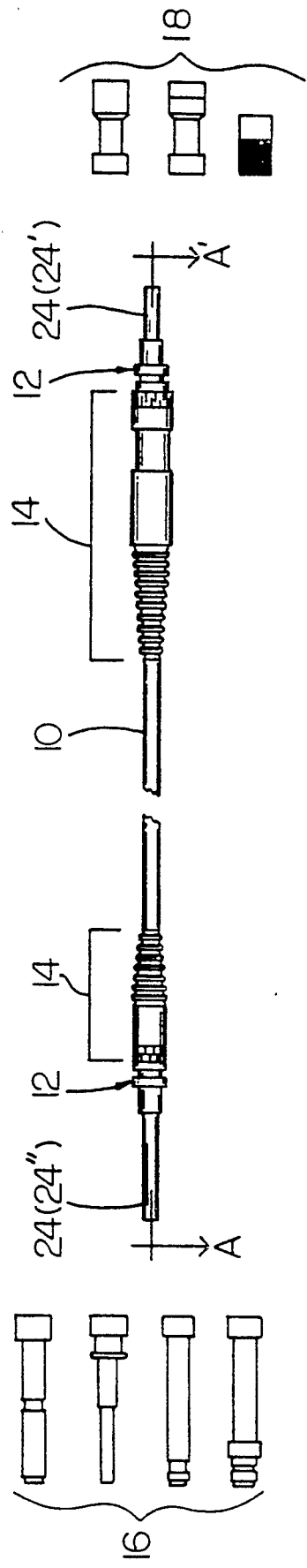
FIG. 1 is a view of a fiber-optic cable with end fittings and a selection of adapters matable with the end fittings of the cable.

Referring to FIG. 1, a fiber-optic bundle containing cable 10 is shown having an end fitting 12 on each end of the cable 10. The end fittings 12 may have different length ends 24 (24', 24") as discussed below. The cable 10 is fabricated from a fiber-optic material known to those skilled in the art and is typically 6 to 15 feet in length and 2.5 to 6.5 millimeters in diameter. A coating or sheath can be applied to the surface of the cable 10, and each cable end may be provided with reinforcing material that acts as a strain relief to protect the segment of the cable nearest the end fitting 12 which is susceptible to damage from bending at an excessively sharp angle, pushing or pulling. The reinforcing material also functions as a hand or finger grip 14 that is fairly rigid near the end fitting 12 and gradually becomes more flexible as it extends toward the center of the cable 10.

FIG. 1 also depicts a representative selection of adapters compatible for use with specific light sources and light utilization devices. The adapters may be divided into two groups: light source adapters 16 for connection to a light source (not shown) and instrument adapters 18 for connection to a light utilization device (not shown) or other device such as a surgical headlight. Examples of light source adapters 16 include: ACMI, AFI, Cabot, Codman, Cuda, Luxtec, Pilling headlight, Zimmer, V. Mueller, ACMI-long, Aspen, Eder, Stryker, Designs for Vision, Olympus, Pilling instrument, Karl Storz, Wolf, LINVATEC, MP Video, BFW-Wehmerlite, Zeiss-large, and Zeiss-small fittings. Exemplary instrument adapters 18 include ACMI, AFI, Aspen, Cabot, Codman, Cuda, Eder, Pilling headlight, Stryker, Zimmer, Female for a Brand A Luxtec instrument, Designs for Vision headlight, Luxtec headlight, Pilling instrument, Karl Storz, Olympus, Wolf, LINVATEC, MP Video, BFW-Wehmerlite, Zeiss headlight and microscope fittings.

Figure 2:
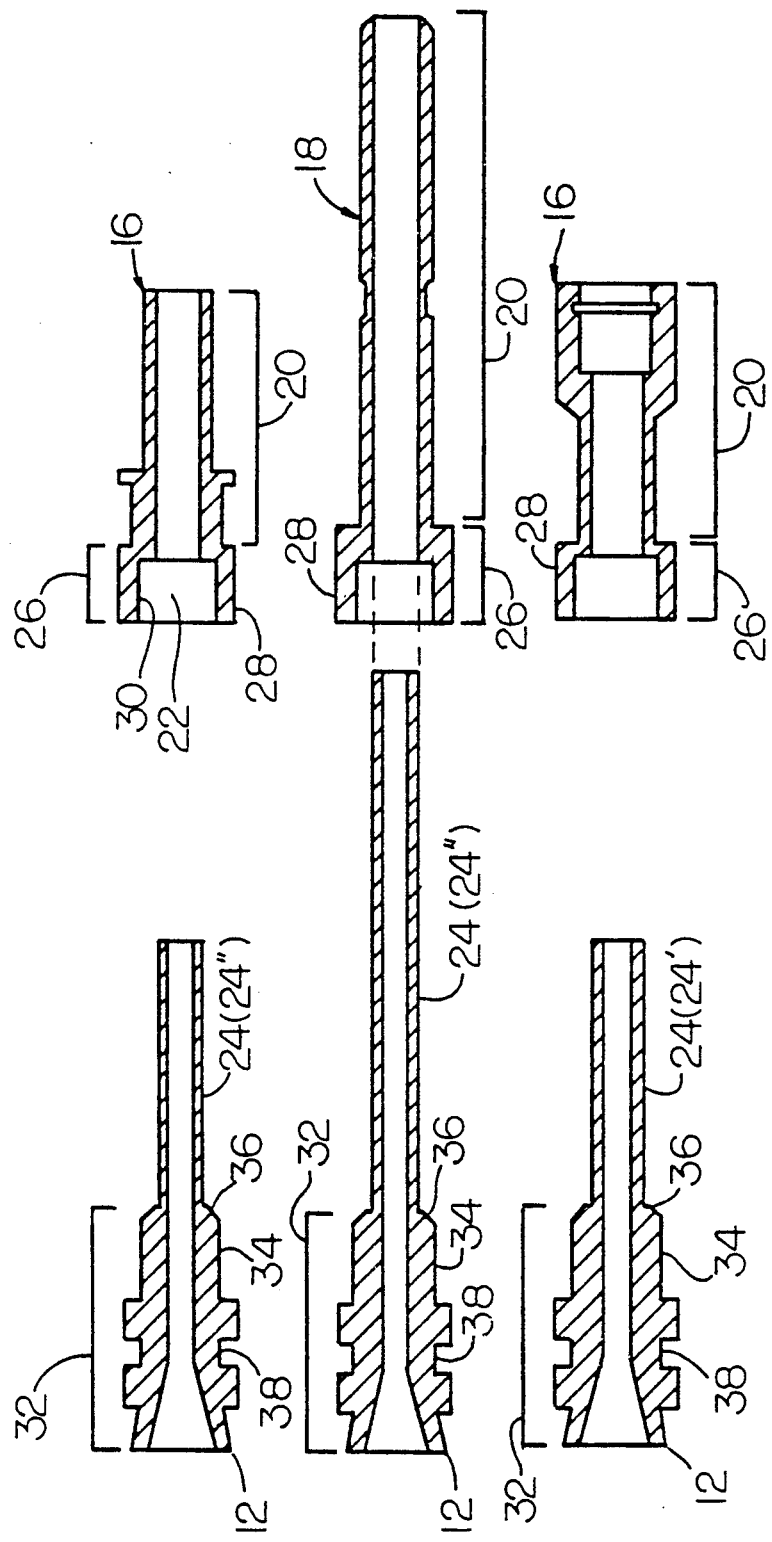
FIG. 2 is a sectional view of the end fitting and adapters of FIG. 1, taken along the line A—A'.

Referring to FIG. 2, an end fitting 12 and a representative selection of adapters 16, 18 are shown in cross section along the line A—A' of FIG. 1. A connector portion 20 on one end of each adapter 16, 18 defines a cylindrical passage 22 into which a light emitting end 24 (24' or 24") of the end fitting 12 slides. The exterior of the connector portion 20 has a particularized configuration for connecting the adapter 16, 18 to a light source or light utilization device respectively. The other end of each adapter 16, 18 is a standardized collar 26 that can be crimp fitted with at least one of the end fittings 12. The cylindrical collar 26 includes an exterior surface or a raised shoulder 28 that may be engaged by a crimping tool, and a cylindrical inner surface 30 that is crimped together with the end fitting 12. The end fitting 12 may have different lengths of extensions to ensure the termination of the light emitting end 24 is placed appropriately on the light source or light utilization device through the terminations.

The end fitting 12, having light emitting end 24, also includes a cable receiving portion 32 for securing the fiber-optic cable 10, as illustrated in FIG. 1, and the sheath to the end fitting 12 by any of a variety of conventional means known to those skilled in the art. The cable receiving portion 32 also includes a cylindrical outer surface 34 that is of a slightly greater circumference than the circumference of the inner surface 30 of the adapter 16, 18. To facilitate proper entry of the shoulder 28, the outer surface 34 can have a tapered leading edge 36 that has a smaller circumference than the inner surface 30 of the adapter 16, 18. The cable receiving portion 32 also includes a notch or circumferential groove 38 that may be engaged by a crimping tool. The fiber bundle is inserted all the way through the light emitting end 24 and glued in place. The end is cleared level and polished.

Figure 3:
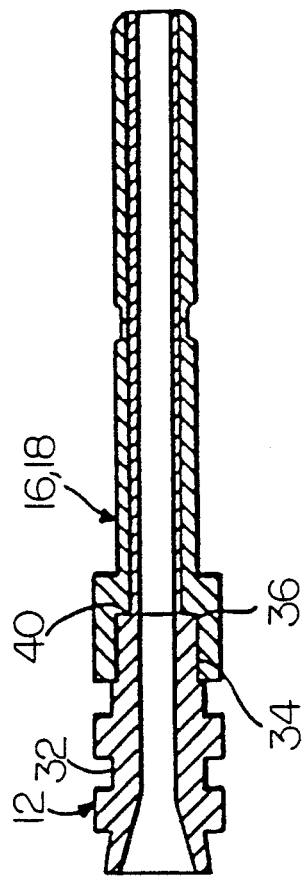
FIG. 3 is a sectional view of an end fitting of FIG. 1 fully crimped to an adapter.

FIG. 3 is a sectional view of the end fitting 12 and adapter 16, 18 of FIG. 2 fully crimped together to make a permanent connection. The outer surface 34 of the cable receiving portion 32 and the inner surface of the collar 26 are made from metals sufficiently compliant that they deform when pushed together under pressure.

To ensure proper insertion distance of the end fitting 12 within the adapter 16, 18, the adapter is provided with a restriction or wall 40 toward which the leading edge 36 is pushed until they abut.

Figure 4:
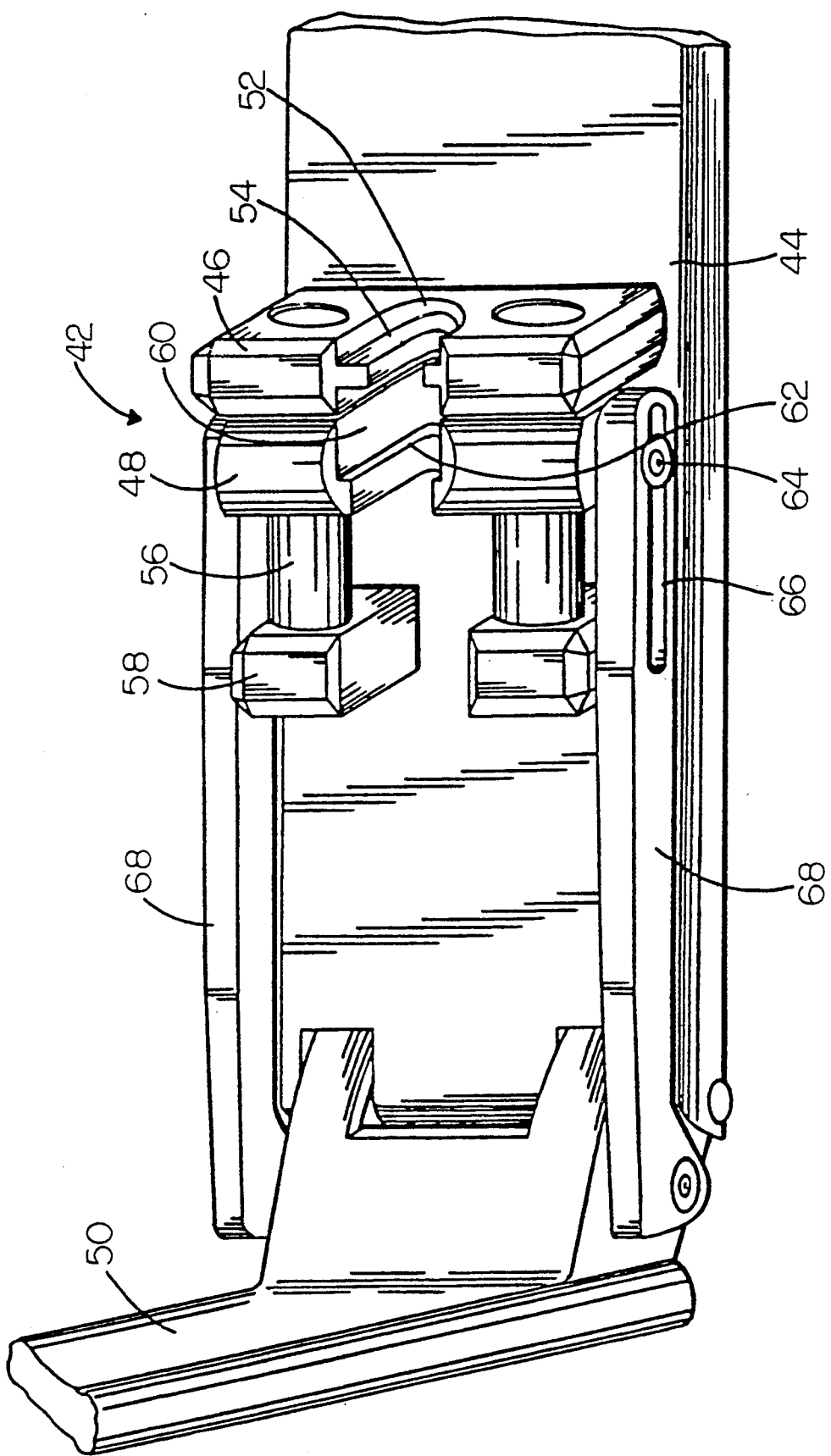
FIG. 4 is a perspective view of a crimping tool for crimping together the end fittings and the adapters of FIG. 1.

FIG. 4 is a perspective view of a crimping tool 42 that is adapted to crimp the end fittings 12 to the adapters 16, 18. The crimping tool 42 has a base 44 to which a retainer 46, a pusher 48, and a hinged lever 50 are affixed. The retainer 46 includes a "U" shaped pocket 52 dimensioned to receive the cable receiving portion 32. A "U" shaped lug 54 extending outward from the surface of the pocket 52 is insertable into the circumferential groove 38 of the end fitting 12 to hold it in a fixed position. The pusher 48 is slidably mounted on a pair of guide rails 56 that pass through the pusher 48 and which are secured to support posts 58 and the retainer 46. The pusher 48 has a "U" shaped recess 60 dimensioned to snugly receive the collar 26 of an adapter 16, 18. A retaining wall 62 having dimensions corresponding to the thickness of the collar 26 provides an engagement surface so that the collar 26 may be pushed toward the retainer 46. Pins 64 mounted on the outermost sides of the pusher 46 are movable within slots 66 in linkages 68 pivotally mounted to the lever 50 which is in turn pivotally mounted to the base 44 of the crimping tool 42. The lever 50 and linkages 68 act as an actuator for the transmission of force to the pusher 48 and may be replaced by an electric motor or an hydraulic cylinder.

Figure 5:
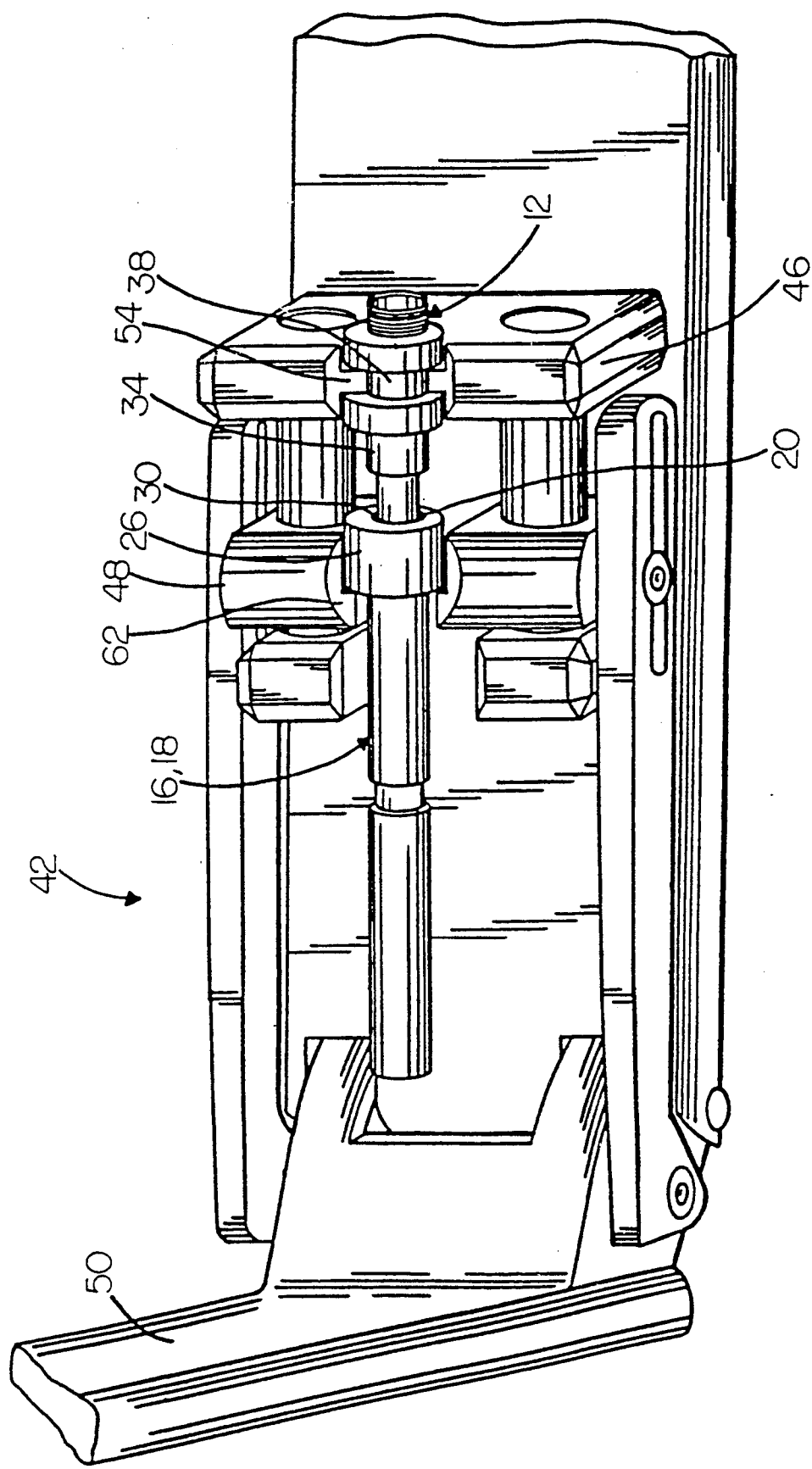
FIG. 5 is a perspective view of the crimping tool of FIG. 4, wherein an end fitting and an adapter of FIG. 1 are positioned within the crimping tool in preparation for crimping.

Referring to FIG. 5, the crimping tool 42 is depicted with an end fitting 12 inserted into the retainer 46 so that the circumferential groove 38 is engaged with the lug 54, and the adapter 16,18 inserted into the pusher 48 so that the collar 26 is engaged with the retaining wall 62. The outer surface 34 of the cable receiving portion 32 is aligned with the inner surface 30 of the collar 26 and is ready for crimping. Prior to inserting the adapter 16, 18 and end fitting 12 into the crimping tool 42, the light emitting end 24 is inserted into the passage 20 as illustrated in FIG. 2.

Figure 6:
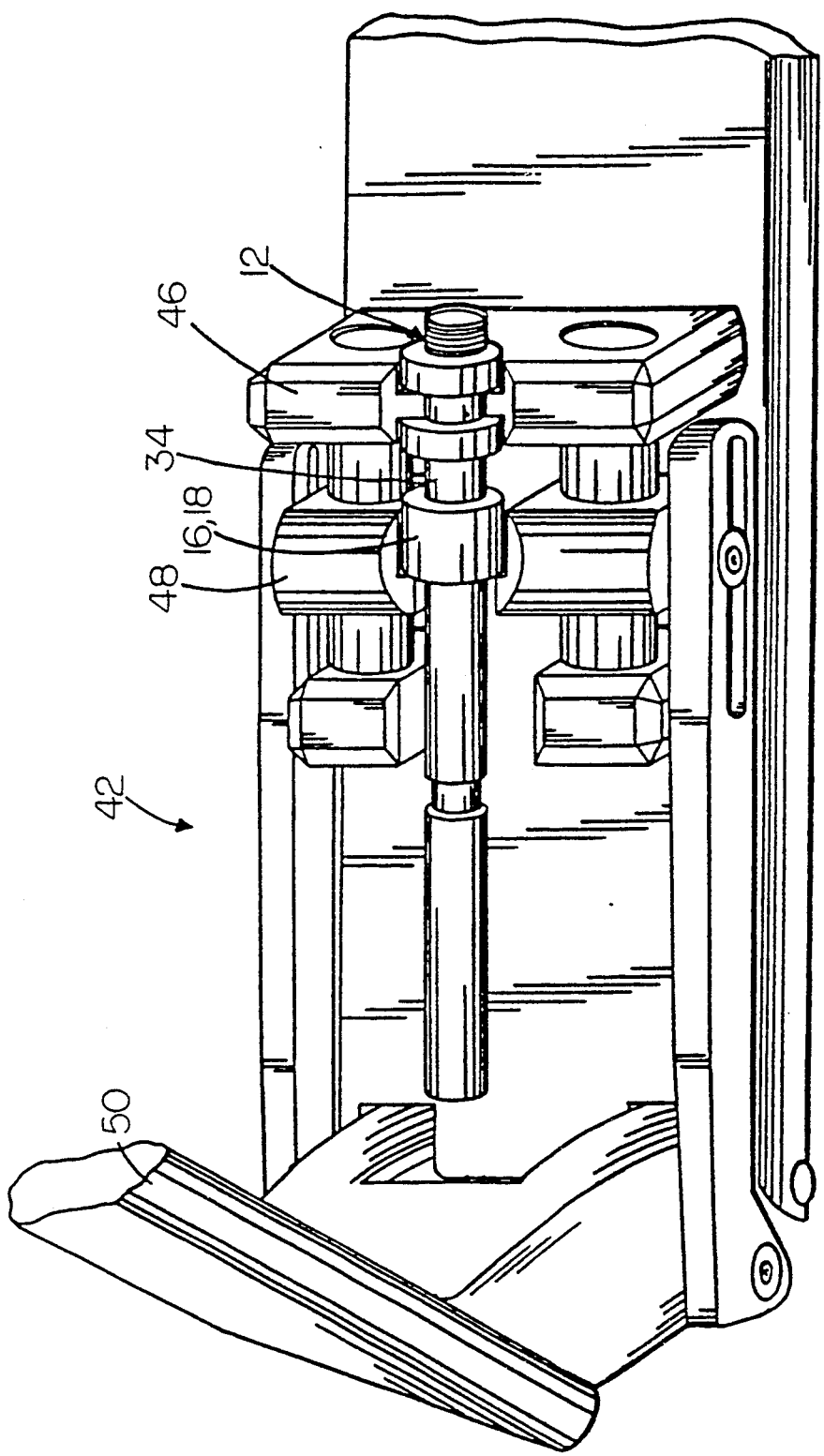
FIG. 6 is a perspective view of the crimping tool of FIG. 5 at one point during the crimping operation.

FIG. 6 shows the beginning of the crimping process wherein the lever 50 has been depressed to cause the linkages to move the pusher 48 toward the retainer 46 and thereby force fit the end fitting 12 and adapter 16, 18 together.

Use of the above described cable 10 having end fittings 12 thereon, in conjunction with the crimping tool 42, provides a system that is easily used outside of a factory for assembling customized cables. To make a customized cable, a system operator selects a cable 10 of a desired length and width, selects an adapter from a group of light source adapters 16 and inserts the end fitting 12 and the light source adapter 16 into the crimping tool 42. The operator actuates the crimping tool 42 to forcibly mate the light source adapter 16 to the end fitting 12 and then removes them from the crimping tool 42. The operator then selects an instrument adapter 18 and repeats the above procedure with the end fitting 12 on the other end of the cable 10. When the procedure is completed, a solidly connected customized cable is ready for connection to a light source or light utilization device.

The outer and inner surfaces 30 and 34 may be reversed although the invention has been shown and described with respect to exemplary embodiments thereof, various other changes, omissions and additions in form and detail thereof may be made therein without departing from the spirit and scope of the invention.

What is claimed is:

1. A system for providing a crimp fit of standardized adapters to a fiber-optic cable, comprising:

a length of fiber-optic cable having a plurality of optical fibers surrounded by a sheath and terminating in an end fitting, wherein said end fitting defines a first passage therethrough surrounding said plurality of optical fibers out to a light emitting end, a securing portion adapted to receive and secure an end of said cable to said sheath thereof, a first cylindrical outer or inner surface for forced mating with a second cylindrical, inner or outer, surface, respectively, of an adapter adapted to mate with a light source or a light utilization device, and a circumferential groove engagable with a crimping tool;

said adapter comprising a passage adapted to receive said portion of said end fitting having said light emitting end of said plurality of optical fibers, said second cylindrical surface adapted to receive said first cylindrical surface of said end fitting in a forced fit, and a connector portion adapted to connect said adapter to said light source or said light utilization device with said light emitting end positioned for light transmission with said light source of said light utilization device; and a crimping tool for forcibly fitting said first cylindrical surface of said end fitting against said second cylindrical surface of said adapter, said crimping tool comprising:

a retainer for holding said second cylindrical surface of said adapter and said first cylindrical surface of said end fitting in alignment; and a pusher for axially pushing together said end fitting and said adapter with respect to each other so as to cause said first cylindrical surface and said second cylindrical surface to be forcibly crimped into fixed positions together.

2. The system of claim 1, wherein said first cylindrical surface of said end fitting has a larger circumference than said second cylindrical surface of said adapter.

3. The system of claim 2, wherein said first cylindrical surface of said end fitting has a leading edge that is tapered so that said leading edge has a smaller circumference than said second cylindrical surface of said adapter to ensure proper alignment of said adapter and said end fitting.

4. The system of claim 2, wherein said second cylindrical surface of said adapter has a leading edge that is tapered so that said leading edge has a smaller circumference than said first cylindrical surface of said end fitting to ensure proper alignment of said adapter and said end fitting.

5. The system of claim 1, wherein said pusher is mechanically actuated to provide the force necessary for crimping.

6. The system of claim 1, wherein said pusher is hydraulically actuated to provide the force necessary for crimping.

7. The system of claim 1, wherein said pusher is electrically actuated to provide the force necessary for crimping.

8. The system of claim 1, wherein said adapter comprises a raised collar and said pusher comprises a piston head having at least one recess therein adapted to receive said raised collar, and wherein placing said collar in said at least one recess engages said adapter with said pusher.

9. The system of claim 1, wherein said retainer holds said end fitting in a fixed position within said crimping tool and said pusher pushes said adapter toward said end fitting.

10. The system of claim 1, further comprising a second end fitting on a second end of said cable, wherein said second end fitting is force fitted to a second adapter by crimping.

11. The system of claim 10, wherein said first adapter is a light source adapter and wherein said second adapter is an instrument adapter.

12. The system of claim 1, wherein said cable has a diameter in the range of 2.5 to 6.5 millimeters and a length in the range of 6–12 feet.

13. The system of claim 1, wherein said first cylindrical surface of said end fitting has a smaller circumference than said second cylindrical surface of said adapter.

14. A system for providing a crimp fit of standardized adapters to a fiber-optic cable, comprising:

a length of fiber-optic cable having a plurality of optical fibers surrounded by a sheath and terminating in an end fitting, wherein said end fitting defines a first passage therethrough surrounding said plurality of optical fibers out to a light emitting end, a securing portion adapted to receive and secure an end of said cable to said sheath thereof, and a first cylindrical surface for forced mating with a second cylindrical surface of an adapter adapted to mate with a light source or a light utilization device;

said adapter comprising a passage adapted to receive said portion of said end fitting having said light emitting end of said plurality of optical fibers, said second cylindrical surface adapted to receive said first cylindrical surface of said end fitting in a forced fit, and a connector portion adapted to connect said adapter to said light source or said light utilization device with said light emitting end position for light transmission with said light source or said light utilization device; and a crimping tool for forcibly fitting said first cylindrical surface of said end fitting against said second cylindrical surface of said adapter, said crimping tool comprising:

a retainer for holding said second cylindrical surface of said adapter and said first cylindrical surface of said end fitting in alignment, said retainer including at least one engagement lug and said portion of said end fitting adapted to receive said end of said cable having a circumferential groove adapted to receive said at least one engagement lug, and wherein placing said at least one engagement lug into said groove engages said end fitting with said retainer; and a pusher for pushing said end fitting and said adapter together so as to cause said first cylindrical surface and said second cylindrical surface to be forcibly crimped into fixed positions together.

15. The system of claim 14, wherein said at least one engagement lug comprises a first lug and a second lug for simultaneously engaging said groove on opposite sides of said end fitting.

16. A method for providing a crimp fit of standardized end fittings to a fiber-optic cable, comprising the steps of:

selecting a length of fiber-optic cable having a first end and a second end, wherein said cable comprises a plurality of optical fibers surrounded by a sheath, wherein said cable terminates at said first end in a first end fitting and at said second end in a second end fitting, wherein said first and second end fittings each define a first passage therethrough surrounding said plurality of optical fibers out to a light emitting end, and a cylindrical outer surface having a circumferential groove therein engagable with a crimping tool for forced mating with a cylindrical inner surface of a first adapter and a second adapter, respectively, and wherein said first and second adapters are adapted to mate with a first and a second light source or light utilization device, respectively;

selecting said first adapter from a group of light source adapters;

placing said first adapter and said first end fitting in a crimping tool, said crimping tool engaging said circumferential groove in said first end fitting;

actuating said crimping tool to move said first end fitting and said first adapter axially with respect to each other to forcibly mate said first adapter with said first end fitting thereby forming a first crimped connection;

removing said first adapter and said first end fitting from said crimping tool;

selecting said second adapter from a group of instrument adapters;

placing said second adapter and said second end fitting in said crimping tool, said crimping tool engaging said circumferential groove in said second end fitting;

actuating said crimping tool to move said second end fitting and said second adapter axially with respect to each other to forcibly mate said second adapter with said second end fitting thereby forming a second crimped connection; and removing said second adapter and said second end fitting from said crimping tool.

17. A crimpable cable connector for a fiber-optic cable having a plurality of optical fibers surrounded by a sheath, comprising:

an end fitting defining a first passage therethrough surrounding said plurality of optical fibers out to a light emitting end, securing a portion adapted to receive and secure an end of said cable to said sheath thereof, a cylindrical outer surface for forced mating with a cylindrical inner surface of an adapter adapted to mate with a light source or a light utilization device, and a circumferential groove engagable with a crimping tool;

said adapter comprising a passage adapted to receive said portion of said end fitting having said light emitting end of said plurality of optical fibers, said cylindrical inner surface adapted to receive said outer surface of said end fitting in an axially forced fit, and a connector portion adapted to connect said adapter to said light source or said light utilization device with said light emitting end positioned for light transmission with said light source or said light utilization device.

18. A crimping tool for forcibly fitting an outer surface of an end fitting against an inner surface of an adapter, comprising:

a retainer for holding said inner surface of said adapter and said outer surface of said end fitting in alignment, wherein said retainer comprises at least one engagement lug for engaging a circumferential groove in said end fitting, wherein placing said at least one engagement lug into said groove engages said end fitting with said retainer, and wherein said retainer holds said end fitting in a fixed position within said crimping tool;

a pusher for pushing said adapter and said end fitting together so as to cause said inner surface and said outer surface to be forcibly crimped into fixed positions together, wherein said pusher comprises a piston head having a recess therein adapted to receive said adapter, wherein placing said adapter in said recess engages said adapter with said pusher, and wherein said pusher pushes said adapter toward said end fitting; and an actuator connected to said pusher by a linkage for moving said pusher with enough force to crimp metal, wherein said actuator is a hinged lever.

* * * * *